US008829126B2

(12) United States Patent  
Guidotti et al.

(10) Patent No.: US 8,829,126 B2  
(45) Date of Patent: Sep. 9, 2014

(54) CATALYST COMPONENTS FOR THE POLYMERIZATION OF OLEFINS

(75) Inventors: Simona Guidotti, Bologna (IT); Fabrizio Piemontesi, Ferrara (IT); Joachim T. M. Pater, Ferrara (IT); Giampiero Morini, Padua (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 13/579,029

(22) PCT Filed: Feb. 22, 2011

(86) PCT No.: PCT/EP2011/052566  
§ 371 (c)(1),  
(2), (4) Date: Aug. 14, 2012

(87) PCT Pub. No.: WO2011/107371  
PCT Pub. Date: Sep. 9, 2011

(65) Prior Publication Data  
US 2012/0316300 A1 Dec. 13, 2012

Related U.S. Application Data

(60) Provisional application No. 61/339,776, filed on Mar. 9, 2010.

(30) Foreign Application Priority Data

Mar. 4, 2010 (EP) .................................... 10155482

(51) Int. Cl.  
*C08F 4/649* (2006.01)  
*C08F 210/06* (2006.01)

(52) U.S. Cl.  
USPC ...................................... 526/125.3; 502/126

(58) Field of Classification Search  
None  
See application file for complete search history.

(56) References Cited

U.S. PATENT DOCUMENTS

| 4,220,554 | A | 9/1980 | Scata et al. | |
|---|---|---|---|---|
| 4,298,718 | A | 11/1981 | Mayr et al. | |
| 4,399,054 | A | 8/1983 | Ferraris et al. | |
| 4,469,648 | A | 9/1984 | Ferraris | |
| 4,495,338 | A | 1/1985 | Mayr et al. | |
| 4,971,937 | A | 11/1990 | Albizzati et al. | |
| 6,399,837 | B1 * | 6/2002 | Wilson et al. | 568/648 |
| 6,465,383 | B2 * | 10/2002 | Williams | 502/103 |
| 2008/0051535 | A1 * | 2/2008 | Vizzini et al. | 526/124.3 |

FOREIGN PATENT DOCUMENTS

| EP | 395083 | 10/1990 |
|---|---|---|
| EP | 553805 | 8/1993 |
| EP | 553806 | 8/1993 |
| EP | 601525 | 6/1994 |
| EP | 922712 | 6/1999 |
| WO | WO-98/44001 | 10/1998 |
| WO | WO-99/57160 | 11/1999 |
| WO | WO-00/52068 | 9/2000 |
| WO | WO-02/30998 | 4/2002 |
| WO | WO-2009/029447 | 7/2009 |
| WO | WO-2009/085649 | 7/2009 |
| WO | WO-2011/107370 | 9/2011 |

OTHER PUBLICATIONS

Chujo, R et al., "Two-site model analysis of 13C n.m.r. of polypropylene polymerized . . . ", Polymer, vol. 35, No. 2 1994, 339.  
Ohnishi, R. et al., "Dimethyoxybezene on propene polymerization with the TICL4/DBP (dibutylphtalate) MGCL 2 Catalyst", vol. 29 No. 1/02—Aug. 1, 1992, 199-203.  
Inoue, Y. et al., "Studies of the stereospecific polymerization mechanism of propylene by a modified . . . ", Polymer, vol. 25, Nov. 1984, 1640.

* cited by examiner

*Primary Examiner* — Ling Choi  
*Assistant Examiner* — Catherine S Branch

(57) ABSTRACT

Catalyst component for the polymerization of olefins comprising Mg, Ti, halogen and two electron donor compounds one of which selected those of formula (I)

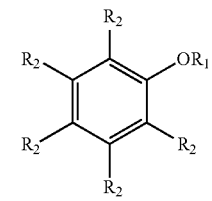

and the other being selected from succinates of formula (II):

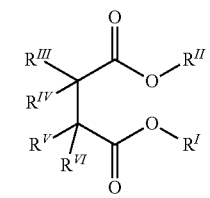

12 Claims, No Drawings

CATALYST COMPONENTS FOR THE POLYMERIZATION OF OLEFINS

This application is the U.S. national phase of International Application PCT/EP2011/052566, filed Feb. 22, 2011, claiming priority to European Application 10155482.2 filed Mar. 4, 2010 and the benefit under 35 U.S.C. 119(e) of U.S. Provisional Application No. 61/339,776, filed Mar. 9, 2010; the disclosures of International Application PCT/EP2011/052566, European Application 10155482.2 and U.S. Provisional Application No. 61/339,776, each as filed, are incorporated herein by reference.

The present invention relates to catalyst components for the polymerization of olefins, in particular propylene, comprising a Mg dihalide based support on which are deposited a Ti compound having at least one Ti-halogen bond and at least two electron donor compounds selected from specific classes. The present invention further relates to the catalysts obtained from said components and to their use in processes for the polymerization of olefins. The catalysts of the present invention are able to give, with high yields, polymers suitable for use in BOPP applications characterized by a reduced cristallinity.

Catalyst components for the stereospecific polymerization of olefins are widely known in the art. Basically two types of catalyst systems are used in the normal processes for the (co)polymerization of olefins. The first one, in its broadest definition, comprises $TiCl_3$ based catalysts components, obtained for example by reduction of $TiCl_4$ with Al-alkyls, used in combination with Al-compounds such as diethylaluminum chloride (DEAC). Despite the good properties of the polymers in terms of isotacticity said catalysts are characterized by a very low activity which causes the presence of large amounts of catalytic residues in the polymers. As a consequence, a further step of deashing is necessary to obtain a polymer having a content of catalytic residue that makes it acceptable for wide use.

The second type of catalyst system comprises a solid catalyst component, constituted by a magnesium dihalide on which are supported a titanium compound and an internal electron donor compound, used in combination with an Al-alkyl compound. Conventionally however, when a higher crystallinity of the polymer is required, also an external donor (for example an alkoxysilane) is needed in order to obtain higher isotacticity. One of the preferred classes of internal donors is constituted by the esters of phthalic acid, diisobutylphthalate being the most used. This catalyst system is capable to give very good performances in terms of activity, isotacticity and xylene insolubility provided that an external electron donor compound is used. In its absence, low yields, low xylene insolubility and poor isotacticity are obtained. On the other hand, when the external donor is used, very high xylene insolubility is obtained only together with a high isotacticity. This may not desirable in certain applications, such as production of bi-oriented polypropylene films (BOPP), where polypropylenes are required to have a relatively lower cristallinity and isotacticity. As a consequence, it would be desirable to have a catalyst component with still improved characteristics, having the capability to provide in high yields polymers coupling xylene insolubility and stereoregularity suitable for application in the BOPP sector.

In WO02/30998 is described a catalyst component comprising Mg, Ti, halogen and two electron donor compounds one of which selected from succinates having certain extractability features and another one selected from esters being more extractable than said succinates. The catalyst is said to be able to modulate isotacticity of the obtained polymer but a substantial decrease of cristallinity is obtained only in connection with the use of external donors having poor stereoregulating activity which are not commonly used. When common stereoregulating donors like cyclohexylmethyldimethoxysilane are used, both xylene insoluble and isotactic index (% isotactic pentads mmmm) are high.

Moreover, the most performing catalysts according to the said document are those based on phthalate esters which, recently, have been associated with possible toxicity issues.

It is therefore felt the need of a versatile catalyst component making possible to easy modulate its stereospecificity, capable to show high activity and free from phthalate toxicity issues.

It is therefore an object of the present invention a catalyst component for the polymerization of olefins comprising Mg, Ti, halogen and two electron donor compounds one of which selected from those of formula (I)

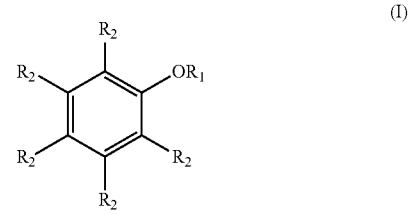

(I)

wherein:

$R_2$, equal to or different from each other, are hydrogen atoms or $C_1$-$C_{20}$ hydrocarbon radicals optionally containing heteroatoms belonging to groups 13-17 of the periodic table of the elements or alkoxy groups of formula —$OR_1$, two or more of the $R_2$ groups can be connected together to form a cycle; $R_1$, equal to or different from each other, are $C_1$-$C_{20}$ hydrocarbon radicals optionally containing heteroatoms belonging to groups 13-17 of the periodic table of the elements, with the proviso that at least one of $R_2$ is —$OR_1$ and the other being selected from succinates of formula (II):

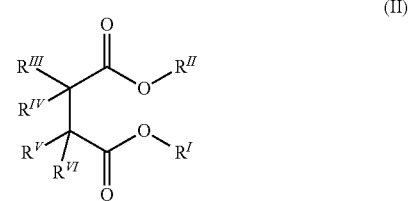

(II)

wherein the radicals $R^I$ and $R^{II}$, equal to or different from each other, are a $C_1$-$C_{20}$ linear or branched alkyl, cycloalkyl, aryl, arylalkyl or alkylaryl group, optionally containing heteroatoms; the radicals $R^{III}$ to $R^{VI}$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R^{III}$ to $R^{VI}$ which are joined to the same carbon atom of the succinate chain can be linked together to form a cycle.

$R^I$ and $R^{II}$ are preferably selected $C_1$-$C_8$ alkyl, cycloalkyl, aryl, arylalkyl and alkylaryl groups. Particularly preferred are the compounds in which $R^I$ and $R^{II}$ are selected from primary alkyls and in particular branched primary alkyls. Examples of suitable $R^I$ and $R^{II}$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (II) is that in which $R^{III}$ to $R^V$ are hydrogen and $R^{VI}$ is a branched alkyl, cycloalkyl, aryl, arylalkyl and alkylaryl radical having from 3 to 10 carbon atoms. Specific examples of suitable monosubstituted succinate compounds are diethyl sec-butylsuccinate, diethyl thexylsuccinate, diethyl cyclopropylsuccinate, diethyl norbornylsuccinate, diethyl perihydrosuccinate, diethyl trimethylsilylsuccinate, diethyl methoxysuccinate, diethyl p-methoxyphenylsuccinate, diethyl p-chlorophenylsuccinate, diethyl phenylsuccinate, diethyl cyclohexylsuccinate, diethyl benzylsuccinate, diethyl cyclohexylmethylsuccinate, diethyl t-butylsuccinate, diethyl isobutylsuccinate, diethyl isopropylsuccinate, diethyl neopentylsuccinate, diethyl isopentylsuccinate, diethyl (1-trifluoromethylethyl)succinate, diethyl fluorenylsuccinate, diisobutyl sec-butylsuccinate, diisobutyl thexylsuccinate, diisobutyl cyclopropylsuccinate, diisobutyl norbornylsuccinate, diisobutyl perihydrosuccinate, diisobutyl trimethylsilylsuccinate, diisobutyl methoxysuccinate, diisobutyl p-methoxyphenylsuccinate, diisobutyl p-chlorophenylsuccinate, diisobutyl cyclohexylsuccinate, diisobutyl benzylsuccinate, diisobutyl cyclohexylmethylsuccinate, diisobutyl t-butylsuccinate, diisobutyl isobutylsuccinate, diisobutyl isopropylsuccinate, diisobutyl neopentylsuccinate, diisobutyl isopentylsuccinate, diisobutyl (1-trifluoromethylethyl)succinate, diisobutyl fluorenylsuccinate, dineopentyl sec-butylsuccinate, dineopentyl thexylsuccinate, dineopentyl cyclopropylsuccinate, dineopentyl norbornylsuccinate, dineopentyl perihydrosuccinate, dineopentyl trimethylsilylsuccinate, dineopentyl methoxysuccinate, dineopentyl p-methoxyphenylsuccinate, dineopentyl p-chlorophenylsuccinate, dineopentyl phenylsuccinate, dineopentyl cyclohexylsuccinate, dineopentyl benzylsuccinate, dineopentyl cyclohexylmethylsuccinate, dineopenthyl t-butylsuccinate, dineopentyl isobutylsuccinate, dineopentyl isopropylsuccinate, dineopentyl neopentylsuccinate, dineopentyl isopentylsuccinate, dineopentyl (1-trifluoromethylethyl)succinate, dineopentyl fluorenylsuccinate. Another preferred group of compounds within those of formula (II) is that in which at least two radicals from $R^{III}$ to $R^{VI}$ are different from hydrogen and are selected from $C_1$-$C_{20}$ linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom. Specific examples of suitable disubstituted succinates are: diethyl 2,2-dimethylsuccinate, diethyl 2-ethyl-2-methylsuccinate, diethyl 2-benzyl-2-isopropylsuccinate, diethyl 2-cyclohexylmethyl-2-isobutylsuccinate, diethyl 2-cyclopentyl-2-n-butyl succinate, diethyl 2,2-diisobutylsuccinate, diethyl 2-cyclohexyl-2-ethylsuccinate, diethyl 2-isopropyl-2-methylsuccinate, diethyl 2-tetradecyl-2-ethylsuccinate, diethyl 2-isobutyl-2-ethylsuccinate, Diethyl 2-(1-trifluoromethylethyl)-2-methylsuccinate, diethyl 2-isopentyl-2-isobutylsuccinate, diethyl 2-phenyl 2-n-butylsuccinate, diisobutyl 2,2-dimethylsuccinate, diisobutyl 2-ethyl-2-methylsuccinate, diisobutyl 2-benzyl-2-isopropylsuccinate, diisobutyl 2-cyclohexylmethyl-2-isobutylsuccinate, diisobutyl 2-cyclopentyl-2-n-butylsuccinate, diisobutyl 2,2-diisobutylsuccinate, diisobutyl 2-cyclohexyl-2-ethylsuccinate, diisobutyl 2-isopropyl-2-methylsuccinate, diisobutyl 2-tetradecyl-2-ethylsuccinate, diisobutyl 2-isobutyl-2-ethylsuccinate, diisobutyl 2-(1-trifluoromethylethyl)-2-methylsuccinate, diisobutyl 2-isopentyl-2-isobutylsuccinate, diisobutyl 2-phenyl 2-n-butyl-succinate, dineopentyl 2,2-dimethylsuccinate, dineopentyl 2-ethyl-2-methylsuccinate, dineopentyl 2-benzyl-2-isopropylsuccinate, dineopentyl 2-cyclohexylmethyl-2-isobutylsuccinate, dineopentyl 2-cyclopentyl-2-n-butylsuccinate, dineopentyl 2,2-diisobutylsuccinate, dineopentyl 2-cyclohexyl-2-ethylsuccinate, dineopentyl 2-isopropyl-2-methylsuccinate, dineopentyl 2-tetradecyl-2-ethylsuccinate, dineopentyl 2-isobutyl-2-ethylsuccinate, dineopentyl 2-(1-trifluoromethylethyl)-2-methylsuccinate, dineopentyl 2-isopentyl-2-isobutylsuccinate, dineopentyl 2-phenyl 2-n-butylsuccinate.

Furthermore, also the compounds in which at least two radicals different from hydrogen are linked to different carbon atoms of the succinate chain, that is $R^{III}$ and $R^V$ or $R^{IV}$ and $R^{VI}$ are particularly preferred. Among them, particularly preferred are the succinates containing only two radicals different from hydrogen each of which linked to different carbon atoms of the succinate chain compounds. More preferably, the radicals are selected from $C_3$-$C_{20}$ linear or branched alkyl, cycloalkyl, aryl, arylalkyl or alkylaryl groups. Specific examples of suitable compounds are diethyl 2,3-bis(trimethylsilyl)succinate, diethyl 2,2-sec-butyl-3-methylsuccinate, diethyl 2-(3,3,3-trifluoropropyl)-3-methylsuccinate, diethyl 2,3-bis(2-ethylbutyl)succinate, diethyl 2,3-diethyl-2-isopropylsuccinate, diethyl 2,3-diisopropyl-2-methylsuccinate, diethyl 2,3-dicyclohexyl-2-methylsuccinate, diethyl 2,3-dibenzylsuccinate, diethyl 2,3-diisopropylsuccinate, diethyl 2,3-bis(cyclohexylmethyl)succinate, diethyl 2,3-di-t-butylsuccinate, diethyl 2,3-diisobutylsuccinate, diethyl 2,3-di neopentylsuccinate, diethyl 2,3-diisopentylsuccinate, diethyl 2,3-(1-trifluoromethylethyl)succinate, diethyl 2,3-tetradecylsuccinate, diethyl 2,3-fluorenylsuccinate, diethyl 2-isopropyl-3-isobutylsuccinate, diethyl 2-t-butyl-3-isopropylsuccinate, diethyl 2-isopropyl-3-cyclohexylsuccinate, diethyl 2-isopentyl-3-cyclohexylsuccinate, diethyl 2-tetradecyl-3-cyclohexylmethylsuccinate, diethyl 2-cyclohexyl-3-cyclopentylsuccinate. diisobutyl 2,3-diethyl-2-isopropylsuccinate, diisobutyl 2,3-diisopropyl-2-methylsuccinate, diisobutyl 2,3-dicyclohexyl-2-methylsuccinate, diisobutyl 2,3-dibenzylsuccinate, diisobutyl 2,3-diisopropylsuccinate, diisobutyl 2,3-bis(cyclohexylmethyl)succinate, diisobutyl 2,3-di-t-butylsuccinate, diisobutyl 2,3-diisobutylsuccinate, diisobutyl 2,3-dineopentylsuccinate, diisobutyl 2,3-diisopentylsuccinate, diisobutyl 2,3-(1-trifluoromethylethyl)succinate, diisobutyl 2,3-tetradecylsuccinate, diisobutyl 2,3-fluorenylsuccinate, diisobutyl 2-isopropyl-3-isobutylsuccinate, diisobutyl 2-t-butyl-3-isopropylsuccinate, diisobutyl 2-isopropyl-3-cyclohexylsuccinate, diisobutyl 2-isopentyl-3-cyclohexylsuccinate, diisobutyl 2-tetradecyl-3-cyclohexylmethylsuccinate, diisobutyl 2-cyclohexyl-3-cyclopentylsuccinate, dineopentyl 2,3-bis(trimethylsilyl)succinate, dineopentyl 2,2-sec-butyl-3-methylsuccinate, dineopentyl 2-(3,3,3-trifluoropropyl)-3-methylsuccinate, dineopentyl 2,3-bis(2-ethylbutyl)succinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-dibenzylsuccinate, dineopentyl 2,3-diisopropylsuccinate, dineopentyl 2,3-bis(cyclohexylmethyl)succinate, dineopentyl 2,3-di-t-butylsuccinate, dineopentyl 2,3-diisobutylsuccinate, dineopentyl 2,3-dineopentylsuccinate, dineopentyl 2,3-diisopentylsuccinate, dineopentyl 2,3-(1-trifluoromethylethyl)succinate, dineopentyl 2,3-tetradecylsuccinate, dineopentyl 2,3-fluorenylsuccinate, dineopentyl 2-isopropyl-3-isobutylsuccinate, dineopentyl 2-t-butyl-3-isopropylsuccinate, dineopentyl 2-isopropyl-3-cyclohexylsuccinate, dineopentyl 2-isopentyl-3-cyclohexylsuccinate, dineopentyl 2-tetradecyl-3-cyclohexylmethyl succinate, dineopentyl 2-cyclohexyl-3-cyclopentylsuccinate.

In general, it is preferred in the donor of formula (I) the two —$OR_1$ groups are in ortho position to each other. Accordingly, 1,2-dialkoxybenzenes, 1,2-dialkoxy-alkyl-benzenes, 2,3-dialkoxy-alkyl-benzenes or 3,4-dialkoxy-alkyl-benzenes are preferred. The other $R_2$ groups are preferably selected from hydrogen, C1-C5 alkyl groups and $OR_1$ groups. When also the other $R_2$ is an alkoxy group $OR_1$, a trialkoxybenzene derivative is obtained and in this case the third alkoxy may be vicinal (ortho) to the other two alkoxy or in meta position with respect to the closest alkoxy group. Preferably, $R_1$ is selected from C1-C10 alkyl groups and more preferably from C1-C5 linear or branched alkyl groups. Linear alkyls are preferred. Preferred alkyls are methyl, ethyl, n-propyl, n-butyl and n-pentyl. When one or more of the other $R_2$ is a C1-C5 linear or branched alkyl groups, alkyl-alkoxybenzenes are obtained. Preferably, $R_2$ is selected from methyl or ethyl. According to a preferred embodiment one of the $R_2$ is methyl and the remaining are hydrogen.

One of the preferred subclasses of donor of formula (I) is that of the dialkoxytoluenes, among this class preferred members are 2,3-dimethoxytoluene, 3,4-dimethoxytoluene, 3,4-diethoxytoluene, 3,4,5-trimethoxytoluene.

When two or more of the $R_2$ groups are linked to form a cycle, polycyclic structures containing at least one benzene ring are obtained. The cycles fused on the benzene ring can be saturated or unsaturated. Among the preferred polycyclic structures are the di- or polyalkoxy naphthalenes optionally substituted with C1-C10 hydrocarbon groups.

When all the other $R_2$ groups are hydrogen it is preferred that the $R_1$ groups are selected from C1-C5 alkyl groups and preferably from methyl, ethyl, and butyl.

Very surprisingly it has been found that the performances of the above-disclosed catalysts are not merely intermediate between those of the catalyst components containing the single donors. While we do not intend being bound to any theoretical interpretation, it can be said that a synergic interaction between the elements of the catalyst component, and maybe in particular between the above mentioned donors, is the basis for explaining the unexpected behaviour that leads to the preparation of polymers having a cristallinity lower than that obtainable with the catalyst containing only the donors of formula (II).

As explained above, the catalyst components of the invention comprise, in addition to the above electron donors, Ti, Mg and halogen. In particular, the catalyst components comprise a titanium compound, having at least a Ti-halogen bond and the above mentioned electron donor compounds supported on a Mg halide. The magnesium halide is preferably $MgCl_2$ in active form which is widely known from the patent literature as a support for Ziegler-Natta catalysts. U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$ can be used, where n is the valence of titanium, y is a number between 1 and n−1, X is halogen and R is a hydrocarbon radical having from 1 to 10 carbon atoms.

The preparation of the solid catalyst component can be carried out according to several methods. According to one of these methods, the magnesium dichloride in an anhydrous state, the titanium compound and the electron donor compounds are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the electron donor compounds are treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated with an excess of $TiCl_4$ at a temperature of about 80 to 135° C. in the presence of the electron donor compounds. The treatment with $TiCl_4$ is repeated and the solid is washed with hexane in order to eliminate any non-reacted $TiCl_4$.

A further method comprises the reaction between magnesium alcoholates or chloroalcoholates (in particular chloroalcoholates prepared according to U.S. Pat. No. 4,220,554) and an excess of $TiCl_4$ in the presence of the electron donor compounds at a temperature of about 80 to 120° C.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. Nos. 4,399,054 and 4,469,648. The so obtained adduct can be directly reacted with Ti compound or it can be previously subjected to thermal controlled dealcoholation (80-130° C.) so as to obtain an adduct in which the number of moles of alcohol is generally lower than 3 preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The electron donor compounds can be added during the treatment with $TiCl_4$. They can be added together in the same treatment with $TiCl_4$ or separately in two or more treatments.

The preparation of catalyst components in spherical form are described for example in European Patent Applications EP-A-395083, EP-A-553805, EP-A-553806, EPA601525 and WO98/44001.

The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10.000 Å generally ranges from 0.3 to 1.5 cm$^3$/g, preferably from 0.45 to 1 cm$^3$/g.

The solid catalyst component has an average particle size ranging from 5 to 120 μm and more preferably from 10 to 100 μm.

In any of these preparation methods the desired electron donor compounds can be added as such or, in an alternative way, it can be obtained in situ by using an appropriate precursor capable to be transformed in the desired electron donor compound by means, for example, of known chemical reactions such as etherification, alkylation, esterification, etc.

Regardless to the preparation method used, the final amount of the two or more electron donor compounds is such that the molar ratio with respect to the MgCl$_2$ is from 0.01 to 1, preferably from 0.05 to 0.5, while the molar ratio between the donor of formula (I) and that of formula (II) ranges from 0.1 to 5 preferably from 0.2 to 2 and more preferably from 0.2 to 1.5.

The solid catalyst components according to the present invention are converted into catalysts for the polymerization of olefins by reacting them with organoaluminum compounds according to known methods.

In particular, it is an object of the present invention a catalyst for the polymerization of olefins CH$_2$=CHR, in which R is hydrogen or a hydrocarbyl radical with 1-12 carbon atoms, comprising the product obtained by contacting:
(i) the solid catalyst component as disclosed above and
(ii) an alkylaluminum compound.

The alkyl-Al compound (II) is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides, such as AlEt$_2$Cl and Al$_2$Et$_3$Cl$_3$, possibly in mixture with the above cited trialkylaluminums.

As explained above, the catalyst component of the invention when used in the polymerization of propylene in the absence of external donors are able to give polymers with reduced level of cristallinity with respect to the catalyst of the prior art based on succinates of formula (II).

If desired, the catalyst components of the invention can also be used in combination with an external donor (iii) thereby obtaining higher values of both xylene insolubility and isotacticity. However, said values, individually or as a balance, are always lower than the values obtainable with the catalyst containing the donors of formula (II) only.

Suitable external electron-donor compounds include silicon compounds, ethers, esters, amines, heterocyclic compounds and particularly 2,2,6,6-tetramethyl piperidine and ketones.

Another class of preferred external donor compounds is that of silicon compounds of formula R$_a^5$R$_b^6$Si(OR$^7$)$_c$, where a and b are integers from 0 to 2, c is an integer from 1 to 4 and the sum (a+b+c) is 4; R$^5$, R$^6$, and R$^7$, are alkyl, cycloalkyl or aryl radicals with 1-18 carbon atoms optionally containing heteroatoms. Particularly preferred are the silicon compounds in which a is 1, b is 1, c is 2, at least one of R$^5$ and R$^6$ is selected from branched alkyl, cycloalkyl or aryl groups with 3-10 carbon atoms optionally containing heteroatoms and R$^7$ is a C$_1$-C$_{10}$ alkyl group, in particular methyl. Examples of such preferred silicon compounds are methylcyclohexyldimethoxysilane (C donor), diphenyldimethoxysilane, methyl-t-butyldimethoxysilane, dicyclopentyldimethoxysilane (D donor), (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, methyl(3,3,3-trifluoro-n-propyl)dimethoxysilane. Moreover, are also preferred the silicon compounds in which a is 0, c is 3, R$^6$ is a branched alkyl or cycloalkyl group, optionally containing heteroatoms, and R$^7$ is methyl. Examples of such preferred silicon compounds are cyclohexyltrimethoxysilane, t-butyltrimethoxysilane and thexyltrimethoxysilane.

The electron donor compound (iii) is used in such an amount to give a molar ratio between the organoaluminum compound and said electron donor compound (iii) of from 0.1 to 500, preferably from 1 to 300 and more preferably from 3 to 100.

Therefore, it constitutes a further object of the present invention a process for the (co)polymerization of olefins CH$_2$=CHR, in which R is hydrogen or a hydrocarbyl radical with 1-12 carbon atoms, carried out in the presence of a catalyst comprising the product of the reaction between:
(i) the solid catalyst component of the invention;
(ii) an alkylaluminum compound and,
(iii) optionally an electron-donor compound (external donor).

The polymerization process can be carried out according to known techniques for example slurry polymerization using as diluent an inert hydrocarbon solvent, or bulk polymerization using the liquid monomer (for example propylene) as a reaction medium. Moreover, it is possible to carry out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 5 MPa, preferably between 1 and 4 MPa. In the bulk polymerization the operating pressure is generally between 1 and 8 MPa, preferably between 1.5 and 5 MPa.

The following examples are given in order to better illustrate the invention without limiting it.

Characterizations
Polymer Microstructure Analysis 50 mg of each xylene insoluble fraction were dissolved in 0.5 ml of 1,1,2,2-tetrachloroethane-d2. $^{13}$C-NMR spectra were acquired either on a Bruker AV-600 or on a DPX-400 spectrometer operating at 150.91 MHz and 100.61 MHz respectively in the Fourier transform mode at 120° C. The samples were dissolved in 1,1,2,2-tetrachloroethane-d2 at 120° C. with a 8% wt/v concentration. $^{13}$C spectra were acquired with a 90° pulse, 15 seconds of delay between pulses and CPD (bi_WALTZ_65_64pl) to remove $^1$H-$^{13}$C coupling. About 1500 transients were stored in 32K data points using a spectral window of 9000 Hz and 6000 Hz respectively. The peak P$_{\beta\beta}$ carbon was used as internal reference at 21.80 ppm.

For tacticity evaluation of the XI fraction, the methyl peaks were used.

The microstructure analysis was carried out as described in literature (*Polymer,* 1984, 25, 1640, by Inoue Y. et Al. and *Polymer,* 1994, 35, 339, by Chujo R. et Al.).

Determination of X.I.

The solubility in xylene at 25° C. was determined according to the following method: about 2.5 g of polymer and 250 ml of o-xylene were placed in a round-bottomed flask provided with a cooler and a reflux condenser and kept under nitrogen. The mixture obtained was heated to 135° C. and was kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of said xylene-soluble fraction is expressed as a percentage of the original 2.5 grams and then, by difference, the X.I. %.

EXAMPLES

Examples 1-3 and Comparative Example 1

Preparation of Solid Catalyst Components

Into a 1.0-litre round bottom flask, equipped with mechanical stirrer, cooler and thermometer 380 ml of $TiCl_4$ were introduced at room temperature under nitrogen atmosphere. After cooling at 0° C., while stirring, the internal donors diethyl 2,3-diisopropylsuccinate (DIPS) and 3,4-dimethoxytoluene (3,4-DMT) were sequentially added into the flask, in the specific amounts reported in Table 1. Then 15.0 g of microspheroidal $MgCl_2*2.8C_2H_5OH$ (prepared according the method described in ex. 2 of U.S. Pat. No. 4,399,054 but operating at 3,000 rpm instead of 10,000) were also introduced. The temperature was then raised from 0° C. up to 40° C. at a speed of 0.4° C./min and from 40° C. up to 120° C. at a speed of 1.1° C./min. The temperature was maintained fixed at 120° C. for 120 minutes. Thereafter, stirring was stopped, the solid product was allowed to settle and the supernatant liquid was siphoned off maintaining the temperature at 120° C. After the supernatant liquid was removed, additional 380 ml of fresh $TiCl_4$ were added. The mixture was then heated at 120° C. and kept at this temperature for 60 minutes. Once again the stirring was interrupted; the solid product was allowed to settle and the supernatant liquid was siphoned off maintaining the temperature at 120° C. A third aliquot of fresh $TiCl_4$ (380 ml) was added, the mixture was maintained under agitation at 120° C. for 30 minutes and then the supernatant liquid was siphoned off. The solid was washed with anhydrous hexane six times (6×100 ml) in temperature gradient up to 60° C. and one time (100 ml) at room temperature. The solid was finally dried under vacuum and analyzed. The amount of Ti, internal donors and their molar ratio in the solid catalyst component are reported in Table 1. In the preparation of the solid catalyst component labeled as example 3, the internal donor 3,4-dimethoxytoluene (3,4-DMT) was introduced at ca. 40÷45° C. during the second titanation step. Detailed experimental conditions related to the internal donor(s) mixture are reported in Table 1.

Polymerization Examples 4-6 and Comparative Example 2

Polymerization of propylene by using solid catalyst components of examples 1-3 and comparative 1.

A 4-litre steel autoclave equipped with a stirrer, pressure gauge, thermometer, catalyst feeding system, monomer feeding lines and thermostating jacket, was purged with nitrogen flow at 70° C. for one hour. Then it was charged at 30° C. under propylene flow with 75 ml of anhydrous hexane, 0.76 g of $AlEt_3$, 0.076 g of dicyclopentyldimethoxysilane (D donor) and 0.006÷0.010 g of solid catalyst component. The autoclave was closed; subsequently 2.0 Nl of hydrogen were added. Then, under stirring, 1.2 Kg of liquid propylene was fed. The temperature was raised to 70° C. in five minutes and the polymerization was carried out at this temperature for two hours. At the end of the polymerization, the non-reacted propylene was removed; the polymer was recovered and dried at 70° C. under vacuum for three hours. Then the polymer was weighed and fractionated with o-xylene to determine the amount of the xylene insoluble (X.I.) fraction. The xylene insoluble fraction was further characterized with $^{13}C$-NMR to determine the value of mmmm %.

Moreover, in Example 4, Example 5 and comparative example 2 another polymerization test was performed by using the same solid catalyst components but, in this case, methylcyclohexyldimethoxysilane (C donor) was added, 0.76 g of $AlEt_3$ and 1.5 Nl of hydrogen were used.

In example 6, a polymerization test was also performed by using the solid catalyst component of example 3 without adding any external donor, by using 0.60 g of $AlEt_3$ and 1.25 Nl of hydrogen. All the results are reported in Table 2.

TABLE 1

| | PREPARATION CONDITIONS | | | | | | COMPOSITION | | | |
|---|---|---|---|---|---|---|---|---|---|---|
| | $1^{st}$ Titanation | | | | $2^{nd}$ Titanation | | | | | |
| Example N° | ID (I) type | mmols | ID (II) type | mmols | ID (I) mmols | ID (II) mmols | Ti wt % | ID (I) wt % | ID (II) wt % | ID(I)/ID(II) m.r. |
| 1 | 3,4-DMT | 5.69 | DIPS | 5.69 | — | — | 3.9 | 2.0 | 11.3 | 0.30 |
| 2 | 3,4-DMT | 2.68 | DIPS | 8.34 | — | — | 3.7 | 0.61 | 13.4 | 0.08 |
| 3 | 3,4-DMT | — | DIPS | 6.64 | 2.14 | — | 3.5 | 1.37 | 11.2 | 0.21 |
| C1 | — | — | DIPS | 13.89 | — | — | 4.8 | — | 13.7 | — |

DIPS = diethyl 2,3-diisopropylsuccinate
3,4-DMT = 3,4-dimethoxytoluene

TABLE 2

| Polymerization Example N° | Catalyst Example N° | ED type | Yield Kg/g | X.I. % | mmmm (XI) % |
|---|---|---|---|---|---|
| 4 | 1 | D donor | 63.1 | 95.0 | 95.0 |
| | | C donor | 49.0 | 93.0 | 94.5 |
| 5 | 2 | D donor | 74.0 | 97.4 | 97.0 |
| | | C donor | 60.3 | 96.8 | 96.0 |
| 6 | 3 | D donor | 64.7 | 97.1 | n.d. |
| | | Absent | 72.2 | 90.8 | 93.5 |
| C2 | C1 | D donor | 59.2 | 98.6 | 97.6 |
| | | C donor | 58.6 | 98.3 | 97.0 |

D donor = dicyclopentyldimethoxysilane
C donor = methylcyclohexyldimethoxysilane
n.d. = not determined

The invention claimed is:

1. A catalyst component for the polymerization of olefins comprising Mg, Ti, halogen and two internal electron donor compounds, one of which is selected from those of formula (I):

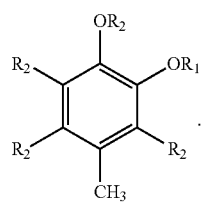

wherein:

R$_2$, equal to or different from each other, are hydrogen atoms or C$_1$-C$_{20}$ hydrocarbon radicals optionally containing heteroatoms belonging to groups 13-17 of the periodic table of the elements or alkoxy groups of formula —OR$_1$, and at least two of the R$_2$ groups can be connected together to form a cycle; R$_1$ groups, equal to or different from each other, are C$_1$-C$_{20}$ hydrocarbon radicals optionally containing heteroatoms belonging to groups 13-17 of the periodic table of the elements, with the proviso that at least one of R$_2$ is —OR$_1$ and the other being selected from succinates of formula (II):

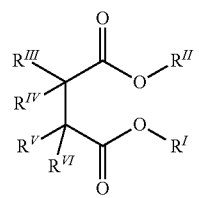

wherein the radicals R$^I$ and R$^{II}$, equal to or different from each other, are a C$_1$-C$_{20}$ linear or branched alkyl, alkenyl, cycloalkyl, aryl, arylalkyl or alkylaryl group, optionally containing heteroatoms; the radicals R$^{III}$ to R$^{VI}$ equal to or different from each other, are hydrogen or a C$_1$-C$_{20}$ linear or branched alkyl, alkenyl, cycloalkyl, aryl, arylalkyl or alkylaryl group, optionally containing heteroatoms, and the radicals R$^{III}$ to $^{VI}$ which are joined to the same carbon atom of the succinate chain can be linked together to form a cycle.

2. The catalyst component according to claim 1 wherein in the donor of formula (I) the two —OR$_1$ groups are in ortho position to each other.

3. The catalyst component according to claim 2 wherein the donor of formula (I) is selected from 1,2-dialkoxybenzenes, 1,2-dialkoxy-alkyl-benzenes, 2,3-dialkoxyalkyl-benzenes or 3,4-dialkoxy-alkyl-benzenes.

4. The catalyst component according to claim 3 wherein the other R$_2$ groups, are independently, selected from hydrogen and C1-C5 alkyl groups.

5. The catalyst component according to claim 1 wherein the succinates are selected from those wherein at least two of the R$^{III}$ to R$^{VI}$ radicals are selected from C$_1$-C$_{20}$ linear or branched alkyl, cycloalkyl, aryl, arylalkyl or alkylaryl groups, optionally containing heteroatoms, and are linked to different carbon atoms of the succinate chain.

6. The catalyst component according to claim 1 wherein the molar ratio between the donor of formula (I) and that of formula (II) is from 0.1 to 5.

7. The catalyst component according to claim 1 comprising a Mg halide and a titanium compound having at least a Ti-halogen bond wherein the titanium compound having at least a Ti-halogen bond and the at least two different electron donor compounds are supported on the Mg halide.

8. The catalyst component according to claim 7 wherein the titanium compound is selected from TiCl$_4$ or TiCl$_3$.

9. A catalyst for the polymerization of olefins comprising the product of the reaction between:
(i) the solid catalyst component according to claim 1 and
(ii) an alkylaluminum compound.

10. The catalyst according to claim 9 further comprising an external electron donor compound.

11. The catalyst according to claim 10 wherein the external electron donor compound is selected from silicon compounds of formula-R$_a^5$R$_b^6$Si(OR$^7$)$_c$, where a and b are integers from 0 to 2, c is an integer from 1 to 4 and the sum (a+b+c) is 4; and R$^5$, R$^6$ and R$^7$ are alkyl, cycloalkyl or aryl radicals with 1-18 carbon atoms optionally containing heteroatoms.

12. A process for the (co)polymerization of olefins CH$_2$=CHR, wherein R is hydrogen or a hydrocarbyl radical with 1-12 carbon atoms, carried out in the presence of a catalyst system comprising the product of the reaction between:
(i) the solid catalyst component according to claim 1;
(ii) an alkylaluminum compound; and
(iii) optionally, an external donor compound.

* * * * *